United States Patent
Wang et al.

(10) Patent No.: US 10,241,296 B1
(45) Date of Patent: Mar. 26, 2019

(54) CAMERA LENS

(71) Applicant: AAC Technologies Pte, Ltd., Singapore (SG)

(72) Inventors: Jianming Wang, Shenzhen (CN); Hiroyuki Teraoka, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/896,131

(22) Filed: Feb. 14, 2018

(51) Int. Cl.
*G02B 3/02* (2006.01)
*G02B 9/60* (2006.01)
*G02B 27/00* (2006.01)

(52) U.S. Cl.
CPC ........... *G02B 9/60* (2013.01); *G02B 27/0025* (2013.01)

(58) Field of Classification Search
CPC ........................................................ G02B 9/60
See application file for complete search history.

(56) References Cited

U.S. PATENT DOCUMENTS

2016/0377834 A1\* 12/2016 Liu .................... G02B 13/0045
359/714

\* cited by examiner

*Primary Examiner* — James C. Jones
(74) *Attorney, Agent, or Firm* — Na Xu; IPro, PLLC

(57) ABSTRACT

A camera lens includes, arranged sequentially from an object side to an image side: a first lens with positive refractive power; a second lens with negative refractive power; a third lens with positive refractive power; a fourth lens with positive refractive power; a fifth lens with negative refractive power. The camera lens satisfies specific conditions.

3 Claims, 5 Drawing Sheets

CAMERA LENS

FIELD OF THE PRESENT DISCLOSURE

The present disclosure relates to the technical field of camera lens.

DESCRIPTION OF RELATED ART

The present disclosure relates to a camera lens. Particularly it relates to a camera lens very suitable for mobile phone camera module and WEB camera lens etc. equipped with high-pixel camera elements such as CCD, CMOS etc. According to the present disclosure, the camera lens is composed of five piece lenses with excellent optical properties: TTL (optical length)/IH (image height)≤1.40, ultra-thin, total angle of view (herein after referred to 2ω) is above 78°, wide angle, F value of high-luminous flux (herein after referred to Fno) is lower than 2.10.

In recent years, various camera devices equipped with camera elements such as CCD, CMOS are extensively popular. Along with development on camera lens toward miniaturization and high performance, ultra-thin and high-luminous flux (Fno) wide angle camera lenses with excellent optical properties are needed in society.

The technology related to the camera lens composed of five piece ultra-thin and high-luminous flux (Fno) wide angle lenses with excellent optical properties is developed gradually. The camera lens mentioned in the proposal is composed of five piece lenses which are arranged sequentially from the object side as follows: a first lens with positive refractive power; a second lens with negative refractive power; a third lens with positive refractive power; a fourth lens with positive refractive power and a fifth lens with negative refractive power.

The camera lens disclosed in embodiments 1~5 of the prior Japanese Patent No. JP5513641 is composed of the above mentioned five piece lenses, but refractive power distribution of the third lens is insufficient and shape of the first and second lens are improper; TL/IH≥1.58, Fno=2.20, so ultra-thin and brightness is insufficient.

The camera lens disclosed in embodiments 1~4 of the prior Japanese Patent Publication No. 2016-020973 is composed of the above mentioned five piece lenses, but refractive power distribution of the first lens is insufficient and shape of the first and second lens are improper; TTL/IH≥1.514, Fno=2.24, so ultra-thin and brightness is insufficient.

Thereof, it is necessary to disclose and provide an improved camera to overcome the above-mentioned disadvantages.

BRIEF DESCRIPTION OF THE DRAWING

Many aspects of the exemplary embodiments can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figure and the embodiments. It should be understood the specific embodiments described hereby are only to explain the disclosure, not intended to limit the disclosure.

Figure 1:
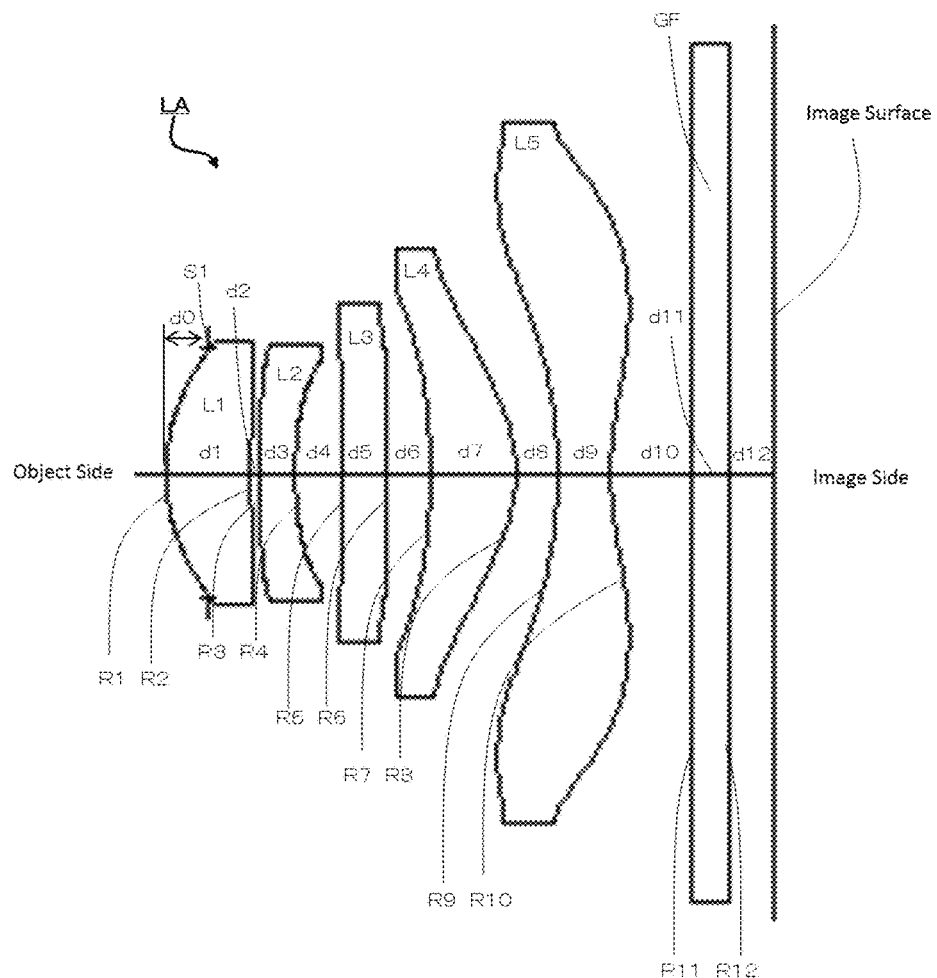
FIG. 1 is a structure diagram of a camera lens LA related to one embodiment of the present disclosure.

FIG. 1 is the structure diagram of a camera lens LA related to one embodiment of the invention. The camera lens LA is composed of five piece lenses which are arranged sequentially from the object side to the imaging surface side including a first lens L1, a second lens L2, a third lens L3, a fourth lens L4, a fifth lens L5. A glass plate GF is arranged between the fifth lens L5 and the imaging surface. And a glass cover or an optical filter having the function of filtering IR can be taken as the glass plate GF.

Moreover, it shall be fine if no glass plate GF is arranged between the fifth lens L5 and the imaging surface.

The first lens L1 has positive refractive power; the second lens L2 has negative refractive power; the third lens L3 has positive refractive power; the fourth lens L4 has positive refractive power; the fifth lens has negative refractive power. Moreover, the surfaces of the six piece lenses should be designed as the aspheric shape preferably in order to correct the aberration well.

A camera lens is characterized in that the camera lens meets following conditions (1)~(4):

$$0.80 \leq f1/f \leq 1.00 \quad (1)$$

$$15.00 \leq f3/f \quad (2)$$

$$-2.00 \leq (R1+R2)/(R1-R2) \leq -1.40 \quad (3)$$

$$2.60 \leq (R3+R4)/(R3-R4) \leq 5.00 \quad (4)$$

where,
f: overall focal distance of the camera lens
f1: focal distance of the first lens
f3: focal distance of the third lens
R1: curvature radius of the first lens' object side surface
R2: curvature radius of the first lens' image side surface
R3: curvature radius of the second lens' object side surface
R4: curvature radius of the second lens' image side surface The positive refractive power of the first lens L1 is specified in the condition (1). The positive refractive power of the first lens L1 is specified in the condition (1). When exceeding lower limit of condition (1), the first lens L1's positive refractive power is too strong to correct aberration and to develop toward wide angle. On the contrary, when exceeding upper limit of condition (1), the first lens L1's positive refractive power is too week to develop toward ultra-thin.

Therefore, numerical range of condition (1) should be set within the numerical range of the following condition (1-A) preferably, $$0.83 \leq f1/f \leq 0.88 \quad (1\text{-}A)$$

The positive refractive power of the third lens L3 is specified in the condition (2). When it is outside the scope of condition (2), Fno≤2.10, correction of chromatic aberration on axle and outside of axle becomes difficult with development toward ultra-thin.

Therefore, numerical range of condition (2) should be set within the numerical range of the following condition (2-A) preferably, $$19.00 \leq f3/f \leq 140.00 \quad (2\text{-}A)$$

The shape of the first lens L1 is specified in the condition (3). When it is outside the scope of condition (3), Fno≤2.10, correction of high order aberration of spherical aberration and etc becomes difficult with development toward ultra-thin and wide angle.

Therefore, numerical range of condition (3) should be set within the numerical range of the following condition (3-A) preferably, $$-1.80 \leq (R1+R2)/(R1-R2) \leq -1.60 \quad (3\text{-}A)$$

Shape of the second lens L2 is specified in the condition (4). Moreover, the development toward Fno≤2.1 ultra-thin and wide angle cannot be implemented easily 10, correction of chromatic aberration on axle becomes difficult with development toward ultra-thin and wide angle.

Therefore, numerical range of condition (4) should be set within the numerical range of the following condition (4-A) preferably, $$3.00 \leq (R3+R4)/(R3-R4) \leq 4.00 \quad (4\text{-}A)$$

The second lens has negative refractive power and meets the following condition (5).

$$-3.00 \leq f2/f \leq -1.50 \quad (5)$$

In which,
f: overall focal distance of the camera lens
f2: focal distance of the second lens The negative refractive power of the second lens L2 is specified in the condition (5). When it is outside the scope of condition (5), Fno≤2.10, correction of chromatic aberration on axle and outside of axle becomes difficult with development toward ultra-thin and wide angle.

Therefore, numerical range of condition (5) should be set within the numerical range of the following condition (5-A) preferably, $$-2.50 \leq f2/f \leq -1.80 \quad (5\text{-}A)$$

The fourth lens has positive refractive power and meets the following condition (6).

$$1.00 \leq (R7+R8)/(R7-R8) \leq 2.00 \quad (6)$$

The shape of the fourth lens L4 is specified in the condition (6). When it is outside the scope of condition (6), Fno≤2.10, development toward wide angle and ultra-thin is difficult.

Therefore, numerical range of condition (6) should be set within the numerical range of the following condition (6-A) preferably, $$1.50 \leq (R7+R8)/(R7-R8) \leq 1.85 \quad (6\text{-}A)$$

Because fix piece lenses of camera Lens LA all have the stated formation and meet all the conditions, so it is possible to produce an ultra-thin, high luminous flux wide angle camera lens with excellent optical properties.

EMBODIMENTS f: overall focal distance of the camera lens LA
f1: focal distance of the first lens L1
f2: focal distance of the second lens L2
f3: focal distance of the third lens L3
f4: focal distance of the fourth lens L4
f5: focal distance of the fifth lens L5
Fno: F Value
2ω: total angle of view
S1: Open aperture
R: curvature radius of optical surface, if a lens is involved it is central curvature radius
R1: curvature radius of the first lens L1's object side surface
R2: curvature radius of the first lens L1's image side surface
R3: curvature radius of the second lens L2's object side surface
R4: curvature radius of the second lens L2's image side surface
R5: curvature radius of the third lens L3's object side surface
R6: curvature radius of the third lens L3's image side surface
R7: curvature radius of the fourth lens L4's object side surface
R8: curvature radius of the fourth lens L4's image side surface
R9: curvature radius of the fifth lens L5's object side surface
R10: curvature radius of the fifth lens L5's image side surface
R11: curvature radius of the glass plate GF's object side surface
R12: curvature radius of the glass plate GF's image side surface
d: center thickness of lenses or the distance between lenses
d 0: axial distance from open aperture S1 to object side surface of the first lens L1
d 1: center thickness of the first lens L
d 2: axial distance from image side surface of the first lens L1 to object side surface of the second lens L2
d 3: center thickness of the second lens L2
d 4: axial distance from image side surface of the second lens L2 to object side surface of the third lens L3
d 5: center thickness of the third lens L3
d 6: axial distance from image side surface of the third lens L3 to object side surface of the fourth lens L4
d 7: center thickness of the fourth lens L4
d 8: axial distance from image side surface of the fourth lens L4 to object side surface of the fifth lens L5
d 9: center thickness of the fifth lens L5
d 10: axial distance from image side surface of the fifth lens L5 to object side surface of the glass plate GF
d 11: center thickness of glass plate GF
d 12: axial distance from image side surface to imaging surface of the glass plate GF
nd: refractive power of line d
nd1: refractive power the first lens L1's line d
nd2: refractive power the second lens L2's line d
nd3: refractive power the third lens L3's line d
nd4: refractive power the fourth lens L4's line d
nd5: refractive power the fifth lens L5's line d
nd6: refractive power the glass plate GF's line d
vd: abbe number
v1: abbe number of the first lens L1
v2: abbe number of the second lens L2
v3: abbe number of the third lens L3 v4: abbe number of the fourth lens L4
v5: abbe number of the fifth lens L5
v6: abbe number of the glass plate GF
TTL: optical length (axial distance from object side surface to the imaging surface of the first lens L1)
LB: axial distance (including thickness of the glass plate GF) from the image side surface to the imaging surface of the fifth lens L5;

$$y=(x2/R)/[1+\{1-(k+1)(x2/R2)\}1/2]+A4 \times 4+A6 \times 6+A8 \times 8+A10 \times 10+A12 \times 12+A14 \times 14+A16 \times 16 \quad (7)$$

In which, R is axial curvature radius, k is cone coefficient, A4, A6, A8, A10, A12, A14, A16 is aspheric coefficient.

For convenience sake, the aspheric surface shown in the formula (7) shall be taken as the aspheric surfaces of all lens' surfaces. However, the invention shall not be limited to polynomial form of the aspheric surface shown in the formula (7).

Embodiment 1

Figure 2:
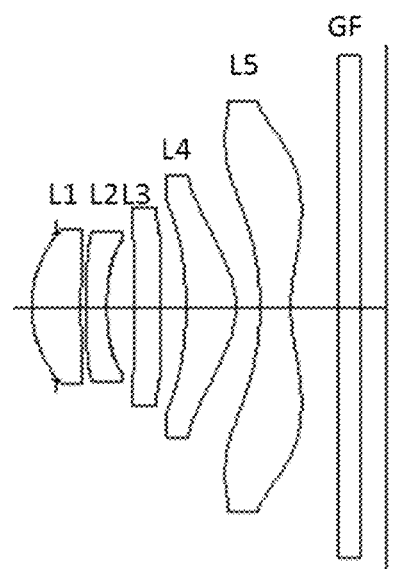
FIG. 2 is a structure diagram of the definite Embodiment 1 of the above-mentioned camera lens LA.

FIG. 2 is the structure diagram of camera lens LA in Embodiment 1. Data shown in Table 1: curvature radius R of the object side surfaces and the image side surfaces, center thicknesses of the lenses, distances d among the lenses, refractive powers nd and abbe numbers of the lens L1~L5 in the Embodiment 1, wherein the camera lens LA is formed by the lens L1~L5; Data shown in Table 2: and the data including conical coefficients k and aspheric coefficients The values in embodiment 1 and 2 and the values corresponding to the parameters specified in the conditions (1)~(6) are shown in subsequent Table 5.

As shown on Table 5, the Embodiment 1 meets the conditions (1)~(6).

Figure 3:
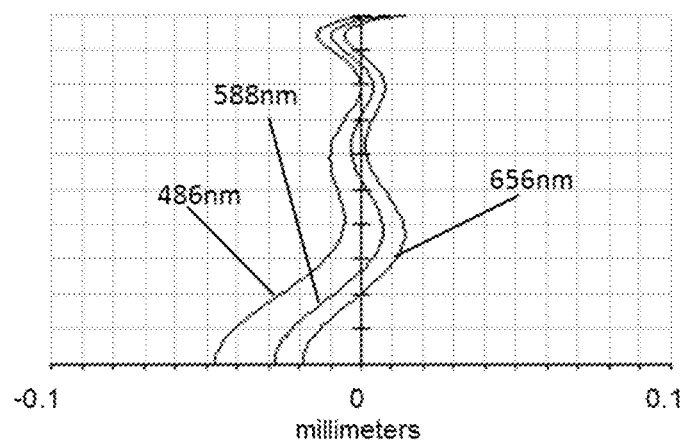
FIG. 3 is the spherical aberration diagram of the camera lens LA in Embodiment 1.
Figure 4:
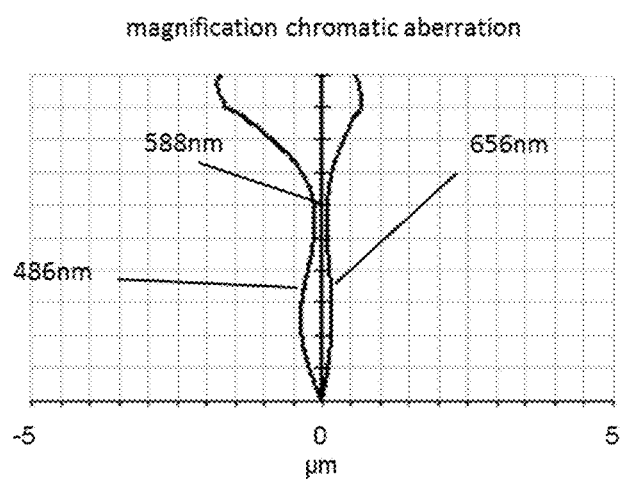
FIG. 4 is the magnification chromatic aberration diagram of the camera lens LA in Embodiment 1.
Figure 5:
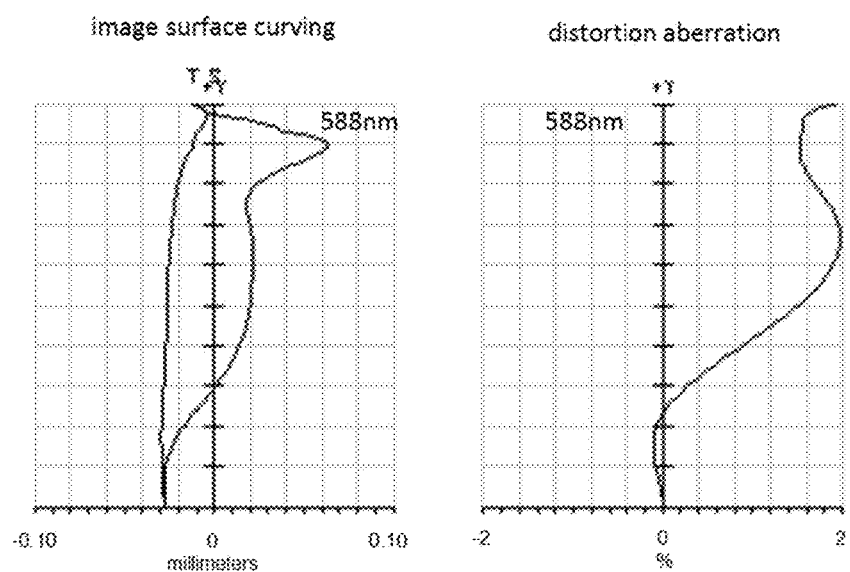
FIG. 5 is the image surface curving diagram and distortion aberration diagram of the camera lens LA in Embodiment 1.

Spherical aberration of camera lens LA in embodiment 1 is to shown in FIG. 3, magnification chromatic aberration of the same is shown in FIG. 4, image surface curving and distortion aberration of the same is shown in FIG. 5. Furthermore, image surface curving S in FIG. 5 is the one opposite to the sagittal image surface, T is the one opposite to the tangent image surface. Same applies for the Embodiment 2. As show in FIG. 3~5, the camera lens in embodiment 1 has the properties as follows: 2 ω=81.0°, TTL/IH=1.346, Fno=2.05, and camera lens is ultra-thin, high-luminous flux and wide angle, so it is not difficult to understand why it has excellent optical properties.

Embodiment 2

Figure 6:
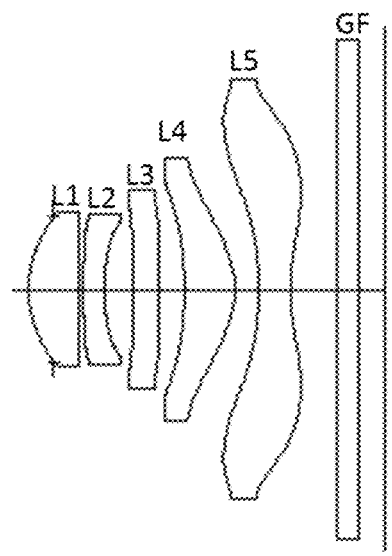
FIG. 6 is the structure diagram of the definite Embodiment 2 of the above-mentioned camera lens LA.

FIG. 6 is the structure diagram of camera lens LA in Embodiment 2. Data shown in Table 3: curvature radius R of the object side surfaces and the image side surfaces, center thicknesses of the lenses, distances d among the lenses, refractive powers n d and abbe numbers of the lens L1~L5 in the Embodiment 1, wherein the camera lens LA is formed by the lens L1~L5; Data shown in Table 4: and the data including to conical coefficients k and aspheric coefficients

TABLE 1

|  | R | d |  | nd |  | v d |
|---|---|---|---|---|---|---|
| S1 | ∞ | d0= −0.230 |  |  |  |  |
| R1 | 1.04703 | d1= 0.467 | nd1 | 1.5441 | v 1 | 56.12 |
| R2 | 3.87089 | d2= 0.047 |  |  |  |  |
| R3 | 3.74760 | d3= 0.200 | nd2 | 1.6422 | v 2 | 22.41 |
| R4 | 1.91641 | d4= 0.259 |  |  |  |  |
| R5 | 6.80316 | d5= 0.250 | nd3 | 1.6422 | v 3 | 22.41 |
| R6 | 7.05159 | d6= 0.240 |  |  |  |  |
| R7 | −3.30902 | d7= 0.474 | nd4 | 1.5441 | v 4 | 56.12 |
| R8 | −0.78601 | d8= 0.228 |  |  |  |  |
| R9 | −2.46176 | d9= 0.291 | nd5 | 1.5352 | v 5 | 56.12 |
| R10 | 1.35164 | d10= 0.450 |  |  |  |  |
| R11 | ∞ | d11= 0.210 | nd6 | 1.5168 | v 6 | 64.17 |
| R12 | ∞ | d12= 0.238 |  |  |  |  |

TABLE 3

|  | R | d |  | nd |  | v d |
|---|---|---|---|---|---|---|
| S1 | ∞ | d0= −0.235 |  |  |  |  |
| R1 | 1.04583 | d1= 0.468 | nd1 | 1.5441 | v 1 | 56.12 |
| R2 | 3.88740 | d2 = 0.047 |  |  |  |  |
| R3 | 3.78224 | d3 = 0.200 | nd2 | 1.6422 | v 2 | 22.41 |
| R4 | 1.91920 | d4 = 0.264 |  |  |  |  |
| R5 | 6.85459 | d5 = 0.250 | nd3 | 1.6422 | v 3 | 22.41 |
| R6 | 6.94302 | d6 = 0.242 |  |  |  |  |
| R7 | −3.28974 | d7 = 0.478 | nd4 | 1.5441 | v 4 | 56.12 |
| 88 | −0.78704 | d8 = 0.227 |  |  |  |  |
| R9 | −2.43130 | d9 = 0.292 | nd5 | 1.5352 | v 5 | 56.12 |
| R10 | 1.35729 | d10 = 0.450 |  |  |  |  |
| R11 | ∞ | d11 = 0.210 | nd6 | 1.5168 | v 6 | 64.17 |
| R12 | ∞ | d12 = 0.239 |  |  |  |  |

TABLE 2

| Cone coefficiente | Aspheric coefficient | | | | | | |
|---|---|---|---|---|---|---|---|
|  | k | A4 | A6 | A8 | A10 | A12 | A14 | A16 |
| R1 | −4.3426E−01 | −1.4646E−02 | 2.8415E−01 | −8.7673E−01 | 5.9625E−01 | 5.4632E−01 | 1.5120E−02 | −1.7736E+00 |
| R2 | −1.0761E+02 | −3.4920E−01 | 3.3420E−01 | 4.8387E+00 | −2.5024E+01 | 5.4973E+01 | −5.9469E+01 | 2.5213E+01 |
| R3 | −1.3423E+02 | −3.5811E−01 | 1.3960E+00 | 1.9671E−01 | −8.2442E+00 | 2.2524E+01 | −3.0793E+01 | 1.8023E+01 |
| R4 | 7.6619E−01 | −1.3213E−01 | 1.1804E+00 | −1.4575E+00 | 4.1096E+00 | −2.2555E+00 | −2.3750E+01 | 4.1970E+01 |
| R5 | 4.1727E+01 | −3.3032E−01 | −5.1555E−02 | 1.3736E+00 | −4.8887E+00 | 1.1380E+01 | −1.2166E+01 | 3.8055E+00 |
| R6 | −4.8331E+01 | −1.9298E−01 | 1.4248E−01 | 5.4128E−01 | −9.4544E−01 | 1.8298E+00 | −2.1130E+00 | 9.3399E−01 |
| R7 | 1.4459E+00 | 4.6284E−02 | −2.0508E−01 | 1.8702E−01 | −9.5399E−02 | 7.1084E−02 | −2.8805E−02 | 6.7926E−03 |
| R8 | 3.8512E+00 | −7.9742E−02 | 1.9187E−01 | −3.8087E−01 | 5.7445E−01 | −4.3934E−01 | 1.5242E−01 | −1.7480E−02 |
| R9 | −2.3553E+01 | −4.2847E−02 | −1.4904E−01 | 2.0720E−01 | −1.0745E−01 | 2.8137E−02 | −3.7068E−03 | 1.9562E−04 |
| R10 | −1.6769E+01 | 8.4880E−02 | 9.7395E−03 | 2.8799E−02 | 1.8826E−02 | 5.9393E−03 | −9.1538E−04 | 5.8277E−05 |

TABLE 4

| Cone coefficient | Aspheric coefficient | | | | | | | |
|---|---|---|---|---|---|---|---|---|
| | k | A4 | A6 | A8 | A10 | A12 | A14 | A16 |
| R1 | −4.3555E−01 | −1.4520E−02 | 2.8272E−01 | −8.7935E−01 | 5.9390E−01 | 5.4900E−01 | 3.6599E−02 | −1.7121E+00 |
| R2 | −1.0903E+02 | 3.4924E−01 | 3.3468E−01 | 4.8383E+00 | −2.5026E+01 | 5.4967E+01 | −5.9480E−01 | 2.5212E+01 |
| R3 | −1.3368E+02 | −3.5843E−01 | 1.3945E+00 | 1.9484E−01 | −8.2486E+00 | 2.2510E+01 | −3.0841E+01 | 1.7865E+01 |
| R4 | 7.3587E−01 | −1.3268E−01 | 1.1788E+00 | −1.4636E+00 | 4.0913E+00 | −2.3030E+00 | −2.3848E+01 | 4.1761E+01 |
| R5 | 4.1269E+01 | −3.3037E−01 | −5.3128E−02 | 1.3709E−00 | −4.8934E+00 | 1.1373E+01 | −1.2175E+01 | 3.7941E+00 |
| R6 | −4.8427E−01 | −1.9296E−01 | −1.4234E−01 | 5.4163E−01 | −9.4509E−01 | 1.8301E+00 | −2.1129E+00 | 9.3404E−01 |
| R7 | 1.4214E+00 | 4.5387E−02 | −2.0503E−01 | 1.6713E−01 | −9.5353E−02 | 7.1161E−01 | −2.8710E−02 | 6.8991E−03 |
| R8 | −3.8478E−00 | −7.9774E−02 | 1.9185E−01 | −3.8089E−01 | 5.7443E−01 | −4.3936E−01 | 1.5240E−01 | −1.7488E−02 |
| R9 | −2.3550E+01 | −4.2848E−02 | −1.4904E−01 | 2.0720E−01 | −1.0745E−01 | 2.81370E−01 | −3.7068E−03 | 1.9561E−04 |
| R10 | −1.6783E+01 | −8.4880E−02 | −9.7395E−03 | 2.8799E−02 | −1.8826E−02 | 5.9393E−03 | −9.1538E−04 | 5.8275E−05 |

As shown on Table 5, the Embodiment 2 meets the conditions (1)~(6).

Figure 7:
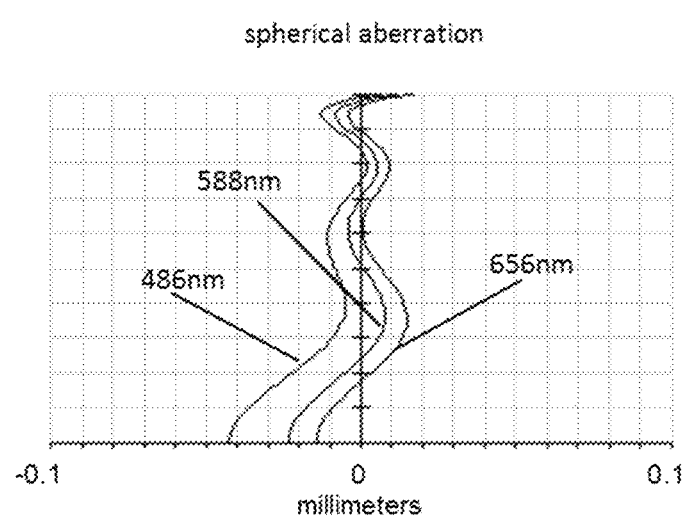
FIG. 7 is the spherical aberration diagram of the camera lens LA in Embodiment 2.
Figure 8:
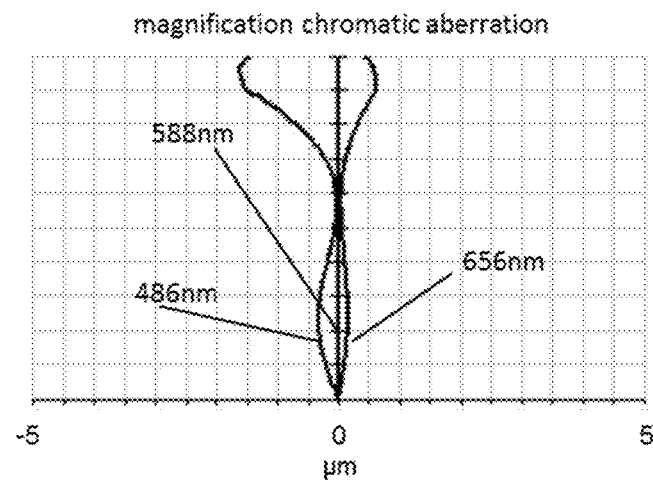
FIG. 8 is the magnification chromatic aberration diagram of the camera lens LA in Embodiment 2.
Figure 9:
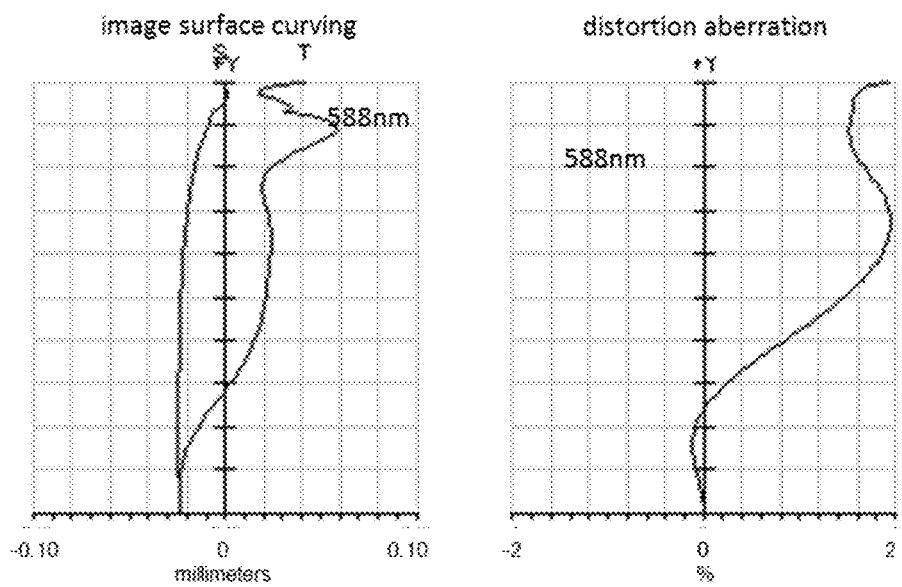
FIG. 9 is the image surface curving diagram and distortion aberration diagram of the camera lens LA in Embodiment 2.

Spherical aberration of camera lens LA in embodiment 2 is shown in FIG. 7, magnification chromatic aberration of the same is shown in FIG. 8, image surface curving and distortion aberration of the same is shown in FIG. 9. As show in FIG. 7~9, the camera lens in embodiment 2 has the properties as follows: $2\omega=80.0°$, TTL/IH=1.351, Fno=2.05, camera lens is ultra-thin, high-luminous flux and wide angle, so it is not difficult to understand why it has excellent optical properties.

The values in all embodiments and the values corresponding to the parameters specified in the conditional formulas (1)-6 are shown in the Table 5. Furthermore, units of various values in Table 5 are respectively $2\omega(°)$, f (mm), f1 (mm), f2 (mm), f3 (mm), f4 (mm), f5 (mm), f6 (mm), TTL (mm), LB (mm), IH (mm).

TABLE 5

| | Embodiment 1 | Embodiment 2 | Condition |
|---|---|---|---|
| f1/f | 0.879 | 0.868 | 1 |
| f3/f | 76.094 | 139.035 | 2 |
| (R1 + R2)/(R1 − R2) | −1.742 | −1.736 | 3 |
| (R3 + R4)/(R3 − R4) | 3.093 | 3.060 | 4 |
| f2/f | −2.250 | −2.212 | 5 |
| (R7 + R8)/(R7 − R8) | 1.623 | 1.629 | 6 |
| Fno | 2.05 | 2.05 | |
| 2ω | 81.0 | 80.6 | |
| TTL/IH | 1.346 | 1.351 | |
| f | 2.836 | 2.863 | |
| f1 | 2.493 | 2.485 | |
| f2 | −6.380 | −6.334 | |
| f3 | 215.802 | 398.057 | |
| f4 | 1.777 | 1.782 | |
| f5 | −1.588 | −1.585 | |
| TTL | 3.354 | 3.367 | |
| LB | 0.898 | 0.899 | |
| IH | 2.492 | 2.492 | |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera lens comprising, arranged sequentially from an object side to an image side:
    a first lens with positive refractive power;
    a second lens with negative refractive power;
    a third lens with positive refractive power;
    a fourth lens with positive refractive power;
    a fifth lens with negative refractive power; wherein
    the camera lens meets following conditions (1)~(3):

$0.80 \leq f1/f \leq 1.00$ (1)

$15.00 \leq f3/f$ (2)

$-2.00 \leq (R1+R2)/(R1-R2) \leq -1.40$ (3)

$2.60 \leq (R3+R4)/(R3-R4) \leq 5.00$ (4)

where,
    f: overall focal distance of the camera lens;
    f1: focal distance of the first lens;
    f3: focal distance of the third lens;
    R1: curvature radius of the first lens' object side surface;
    R2: curvature radius of the first lens' image side surface;
    R3: curvature radius of the second lens' object side surface;
    R4: curvature radius of the second lens' image side surface.

2. The camera lens as described in claim 1 further satisfying following condition (5):

$-3.00 \leq f2/f \leq -1.50$ (5)

where,
    f: overall focal distance of the camera lens;
    f2: focal distance of the second lens.

3. The camera lens as described in claim 1 further satisfying following conditional formula (6):

$1.00 \leq (R7+R8)/(R7-R8) \leq 2.00$ (6)

where,
    R7: curvature radius of the fourth lens' object side surface;
    R8: curvature radius of the fourth lens' image side surface.

* * * * *